US009057451B2

(12) United States Patent
Deperraz et al.

(10) Patent No.: US 9,057,451 B2
(45) Date of Patent: Jun. 16, 2015

(54) METHOD AND APPARATUS FOR ACTUATING A VALVE

(75) Inventors: Nicolas Deperraz, Bons En Chablais (FR); Sadasing Kowlessur, Colgony (CH); Michael Baumgartner, Morges (CH)

(73) Assignee: Fluid Automation Systems SA, Versoix (CH)

( * ) Notice: Subject to any disclaimer, the term of this patent is extended or adjusted under 35 U.S.C. 154(b) by 0 days.

(21) Appl. No.: 13/321,697

(22) PCT Filed: Jun. 11, 2010

(86) PCT No.: PCT/EP2010/003505
§ 371 (c)(1), (2), (4) Date: Nov. 21, 2011

(87) PCT Pub. No.: WO2010/142453
PCT Pub. Date: Dec. 16, 2010

(65) Prior Publication Data

US 2012/0067430 A1 Mar. 22, 2012

(30) Foreign Application Priority Data

Jun. 11, 2009 (FR) ..................................... 09 53910

(51) Int. Cl.
*F16K 31/02* (2006.01)

(52) U.S. Cl.
CPC .................................. *F16K 31/025* (2013.01)

(58) Field of Classification Search
CPC F16K 31/025; F16K 99/0038; F16K 99/0044
USPC ............ 215/11, 75, 81, 129.01, 129.06, 319; 137/625.44, 870, 871
See application file for complete search history.

(56) References Cited

U.S. PATENT DOCUMENTS

| | | | | |
|---|---|---|---|---|
| 3,974,844 | A | 8/1976 | Pimentel | |
| 5,325,880 | A * | 7/1994 | Johnson et al. | 137/1 |
| 5,865,418 | A * | 2/1999 | Nakayama et al. | 251/11 |
| 6,019,113 | A * | 2/2000 | Allston et al. | 137/1 |
| 6,247,493 | B1 * | 6/2001 | Henderson | 137/487.5 |
| 6,318,641 | B1 | 11/2001 | Knebel et al. | |
| 6,679,263 | B2 * | 1/2004 | Luchetti et al. | 128/207.15 |
| 6,843,465 | B1 | 1/2005 | Scott | |
| 7,260,932 | B1 | 8/2007 | Klimowicz | |
| 2003/0198558 | A1 | 10/2003 | Nason et al. | |

FOREIGN PATENT DOCUMENTS

| | | |
|---|---|---|
| JP | 2007032737 A | 2/2007 |
| JP | 2007057089 A | 3/2007 |

* cited by examiner

*Primary Examiner* — Matthew W Jellett
(74) *Attorney, Agent, or Firm* — The Ollila Law Group LLC

(57) ABSTRACT

A valve (100), including a fluid inlet (102) and a fluid outlet (103) formed in a housing (101) is provided. The valve (100) includes a valve seal (209) and a resilient member (207). The resilient member (207) is coupled to the valve seal (209). The valve (100) can also include one or more shape memory alloy component (206) or another electrically actuated component that is coupled to at least a first end (214) of the resilient member (207).

20 Claims, 4 Drawing Sheets

522 208B 506B 211A 507B 509 212 521 525 208A 550 209 508B 506A 213 523 507A 520 550 550 524 508A

METHOD AND APPARATUS FOR ACTUATING A VALVE

TECHNICAL FIELD

The present invention relates to, a valve, and more particularly, to a method and apparatus for actuating a valve.

BACKGROUND OF THE INVENTION

Fluid handling devices are becoming increasingly popular and there is an increased demand for fluid handling devices which are both portable and easy to use. Portable fluid handling devices are being used for applications such as home care, point of care testing, fuel cells, fragrance dispensers, etc. In order for a portable fluid handling device to be effective and efficient, it should be light weight, small in size, consume minimal power, operate with low noise, and be cost effective to manufacture. In many applications, it is also important that the fluid handling device provide an accurate and consistent fluid distribution. Therefore, it is necessary to incorporate an efficient fluid valve in the fluid handling device. In many aspects, the fluid valve characterizes the device's efficiency.

One solution of a portable valve that attempts to meet the above criteria is a miniature solenoid valve. The miniature solenoid valve however, is not as effective as originally anticipated. Solenoid valves are limited in both size as well as power consumption. In order to obtain adequate performance, a solenoid valve typically consumes a substantial amount of power. The power consumption of a solenoid valve, in some circumstances, is unacceptable, especially when using batteries as a power source, for example. The batteries may not be able to provide power to the valve for a sufficient length of time.

Another solution has been the use of electrically actuated piezo valves. Some piezo valves operate using a closing arm that seals against a sealing shoulder when the piezo element is de-activated. These valves typically require a substantial amount of space to operate and may not always provide an adequate solution as they are subject to clogging when used with liquids that may dry around the orifice.

The present invention overcomes this and other problems and an advance in the art is achieved. A SMA component is utilized in a valve where the SMA component acts on a resilient member to actuate the valve. Furthermore, little movement is experienced by a sealing member such that the seal is capable of extended use before failure.

SUMMARY OF THE INVENTION

According to an embodiment of the invention, a valve includes a fluid inlet and a fluid outlet formed in a housing. The valve comprises a valve seal and a resilient member coupled to the valve seal. The valve also includes one or more shape memory alloy component coupled to at least a first end of the resilient member.

According to an embodiment of the invention a valve includes a fluid inlet and a fluid outlet formed in a housing. The valve includes a valve seal and a resilient member coupled to the valve seal. The valve also includes an electrically actuated component coupled to the resilient member.

According to an embodiment of the invention, a method for controlling a flow of a fluid through a valve is provided. The method comprises energizing at least a first shape memory alloy component above a transformation temperature, wherein the shape memory alloy component transforms from a first state to a second state at the transformation temperature. The method also comprises deforming at least a portion of a resilient member from a first position to at least a second position using the first shape memory alloy component as the shape memory alloy transforms from the first state to the second state. The method also comprises actuating a valve seal away from a first valve seal position with the resilient member.

ASPECTS

Preferably, the valve further comprises one or more biasing members coupled to the resilient member and positioned between the resilient member and the one or more shape memory alloy components.

Preferably, the valve further comprises one or more sealing members coupled to the resilient member and located such that the one or more shape memory alloy components is sealed off from a fluid flowing through the valve.

Preferably, the valve further comprises one or more electrical contacts coupled to the one or more shape memory alloy components.

Preferably, the resilient member comprises a deformable portion and a stationary portion.

Preferably, the valve further comprises a valve seal coupling member coupled to the valve seal and the resilient member.

Preferably, the valve further comprises one or more biasing members coupled to the resilient member and positioned between the resilient member and the electrically actuated component.

Preferably, the valve further comprises one or more sealing members coupled to the resilient member and located such that the electrically actuated component is sealed off from a fluid flowing through the valve.

Preferably, the valve further comprises one or more electrical contacts coupled to the electrically actuated component.

Preferably, the valve further comprises one or more latching arms coupled to the resilient member and the housing and movable between a first position and at least a second position.

Preferably, the valve further comprises one or more biasing members coupled to the resilient member on a first side of the one or more latching arms and one or more biasing members coupled to the resilient member on a second side of the one or more latching arms.

Preferably, the step of energizing the shape memory alloy component comprises energizing one or more electrical contacts coupled to the shape memory alloy component.

Preferably, the step of energizing the shape memory alloy component comprises energizing one or more electrical contacts coupled to the shape memory alloy component with a pulse width modulation signal.

Preferably, the step of deforming the resilient member comprises compressing the resilient member until a deformable portion of the resilient member deforms away from the first position.

Preferably, the method further comprises deforming the resilient member with one or more biasing members coupled to at least a first end of the resilient member.

Preferably, the method further comprises the steps of:

- de-energizing the first shape memory alloy component, wherein the first shape memory alloy component transforms from the second state to the first state;
- returning the resilient member to the first position as the first shape memory alloy component transforms from the second state to the first state; and repositioning the valve seal to the first valve seal position as the resilient member returns to its first position.

Preferably, the method further comprises the steps of:

de-energizing the first shape memory alloy component; and retaining the resilient member in the second position using one or more latching arms.

Preferably, the method further comprises the steps of:

energizing at least a second shape memory alloy component above a transformation temperature, wherein the second shape memory alloy component transforms from a first state to a second state at the transformation temperature;

deforming at least a portion of a resilient member from the second position to the first position as the second shape memory alloy component transforms from the first state to the second state; and actuating the valve seal from a second valve seal position back to the first valve seal position with the resilient member.

Preferably, the method further comprises the steps of:

de-energizing the at least second shape memory alloy component; and retaining the resilient member in the first position using one or more latching arms.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
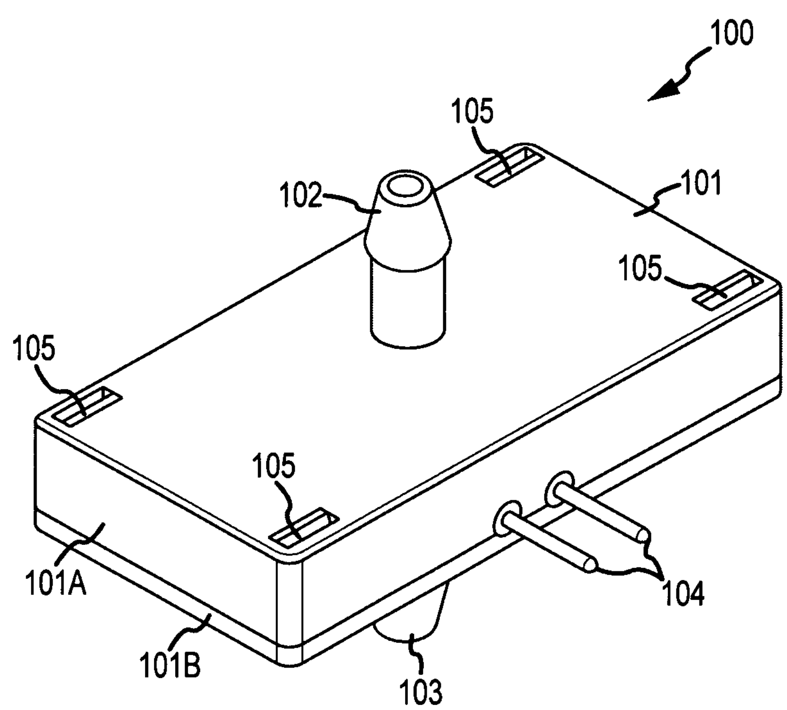
FIG. 1 shows a perspective view of a valve according to an embodiment of the invention.

FIG. 1 shows a valve 100 according to an embodiment of the invention. The valve 100 is optimally sized to be incorporated into a portable fluid delivery device (not shown). However, the valve 100 can also be used in other applications and the scope of the invention should not be limited to use with portable fluid delivery devices as the valve 100 may be enlarged and utilized in a variety of implementations. The valve 100 can advantageously control the delivery of a fluid (liquid, gas, solids suspended in liquid or gas, or a combination thereof).

According to the embodiment shown in FIG. 1, the valve 100 includes a housing 101, a fluid inlet 102, a fluid outlet 103, and one or more electrical contacts 104. Although the valve 100 is shown as comprising only one inlet 102 and one outlet 103, i.e., the valve comprises a 2/2 valve, it should be appreciated that the valve 100 is not limited to a 2/2 valve, but rather other valve arrangements are possible.

According to an embodiment of the invention, the housing 101 comprises two or more portions. In the embodiment shown, the housing 101 comprises a top portion 101A and a bottom portion 101B. According to an embodiment of the invention, the housing 101 can comprise two or more portions 101A, 101B in order to access the internal components of the valve 100. In the embodiment shown, the two housing portions 101A, 101B are coupled together using a plurality of clips 105. According to one embodiment, the clips 105 may be formed in the bottom portion 101B of the housing and engage corresponding apertures 215 formed in the top portion 101A of the housing (See FIG. 2). Although a plurality of clips 105 are shown, it should be understood that the housing portions 101A, 101B may be held together in any suitable manner including, but not limited to, adhesives, bonding, brazing, welding, rivets, etc. In some embodiments, it may be advantageous to utilize a coupling method that allows the two housing portions 101A, 101B to be separated in order to perform maintenance on the interior components of the valve 100, for example. The particular method employed to couple the two housing portions 101A, 101B together is not important for the purposes of the present invention and therefore, should not limit the scope of the present invention. Furthermore it should be understood that while only two housing portions are shown, other embodiments utilize more than two housing portions. Alternatively, the housing 101 may be molded into a single piece. The downside to such an embodiment is that access to the internal components becomes limited. However, there may be situations where such a configuration is desirable.

The fluid inlet 102 is shown as being formed in the top portion 101A of the housing 101. However, it should be understood that the fluid inlet 102 could alternatively be formed in the bottom portion 101B or any other portion of the valve 100 as the position of the fluid inlet 102 shown is merely one embodiment of the invention. The fluid inlet 102 is adapted to be coupled to a pressurized fluid source (not shown). The fluid inlet 102 may be coupled directly to the pressurized fluid source or alternatively, may be coupled using a fluid delivery apparatus such as a fluid hose or other tubing. The valve 100 is designed to control the flow of the pressurized fluid from the pressurized fluid source by entering the valve 100 through the fluid inlet 102 and exiting through the fluid outlet 103. While the fluid inlet 102 and the fluid outlet 103 are shown as extending from the housing 101, it should be appreciated that in other embodiments, the fluid inlet 102 and the fluid outlet 103 comprise apertures capable of accepting a pressurized fluid. Furthermore, it should be appreciated that the valve 100 may include additional fluid inlets/outlets. For example, rather than comprising a 2/2 valve as shown, the valve 100 may comprise a 3/2 valve, for example. Therefore, the particular number of ports provided in the valve should not be limited to the specific examples provided.

The valve 100 also includes one or more electrical contacts 104. The electrical contacts 104 are provided to electrically couple the valve 100 to a power source (not shown). The power source may comprise an external power source such as an electrical outlet. Alternatively, the power source may comprise a battery or a plurality of batteries. In alternative embodiments, the electrical contacts 104 may be located within the housing 101 rather than extending from the housing 101. This may be the case where a battery is kept within the housing 101, for example. The use of the electrical contacts 104 is discussed in greater detail below.

Figure 2:
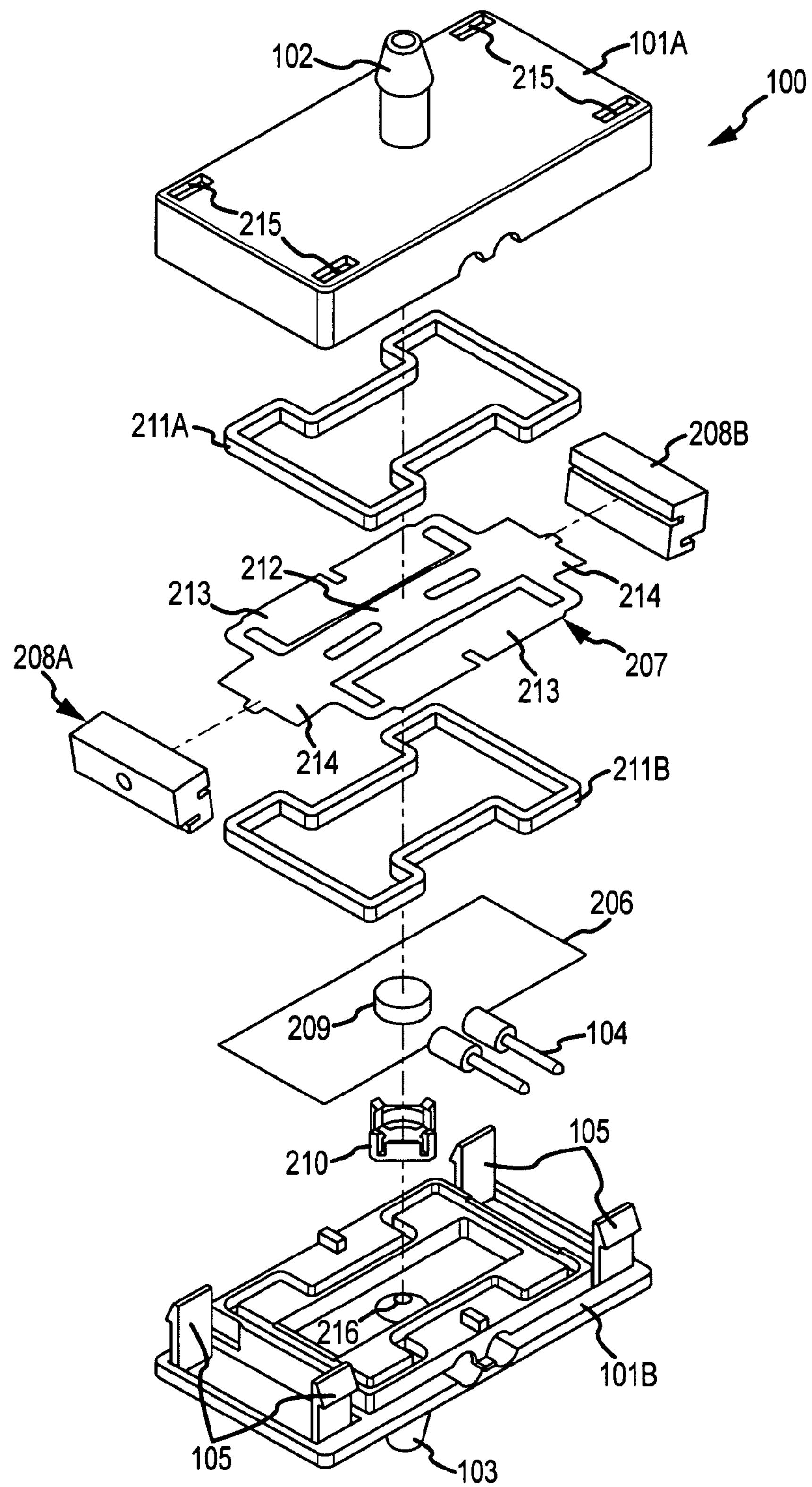
FIG. 2 shows an exploded view of the valve according to an embodiment of the invention.

FIG. 2 shows an exploded view of the valve 100 according to an embodiment of the invention. FIG. 2 shows some of the internal components of the valve 100 according to an embodiment of the invention. However, some of the components have been omitted to simplify the figure. According to the embodiment shown, the valve 100 includes a Shape Memory Alloy (SMA) component 206, a resilient member 207, one or more biasing members 208A, 208B, a valve seal 209, a valve seat 216, a valve coupling member 210, and one or more sealing members 211A, 211B.

As shown in FIG. 2, the SMA component 206 can be coupled to the electrical contacts 104. Although the SMA component 206 is described below as a "wire", it should be appreciated that the SMA component 206 may comprise a variety of different forms and the present invention should not be limited to wires. For example, the SMA component may comprise a plate, a film deposition, etc. Furthermore, although the description below is limited to a discussion of SMA components, it should also be appreciated that in some embodiments, the SMA component can be replaced with alternative electrically actuated biasing devices such as a piezo element, a solenoid, etc. Although a SMA component may provide certain advantages over other actuating devices, in some embodiments, other electrically actuated biasing devices may replace the SMA component and provide adequate results when combined with the remaining features of the valve according to the present invention.

When the electrical contacts 104 are energized, the SMA wire 206 is thermoelectrically heated. Shape memory alloys are metals that are generally known for their physical transformation at a transformation temperature. By combining the appropriate alloys, the transformation temperature of the wire 206 can be determined. The transformation temperature is generally understood as the temperature at which the SMA material transforms from a martensite crystal structure to an austentite crystal structure. When the SMA component 206 is below the transformation temperature, the metal remains in the martensite crystal structure. In the martensite crystal structure, the metal can be physically deformed into a first size and/or shape and can remain in that shape while below the transformation temperature. However, upon heating to above the transformation temperature, the material transforms into the austentite crystal structure where the alloy returns to its "memorized", pre-deformed, second size and/or shape. The transformation that occurs in SMA materials is relatively fast as no diffusion occurs as in many types of phase changes. This unique property of SMA materials can be utilized in the valve 100 in order to selectively open or close the valve 100 as discussed below.

According to an embodiment of the invention, the fluid flow path between the inlet 102 and the outlet 103 can be sealed using a valve seal 209. The valve seal 209 may comprise a poppet as shown, or some other sealing device. As discussed below, the valve seal 209 can be biased against the valve seat 216 to seal the outlet 103 in order to prevent fluid from traveling through the valve 100. According to the embodiment shown, the valve seal 209 can be coupled to the resilient member 207. In the embodiment shown in FIGS. 2-4, the valve seal 209 is coupled to the resilient member 207 using a valve coupling member 210, which secures the valve seal 209 to the resilient member 207. However, it should be appreciated that the valve seal 209 may be coupled to the resilient member 207 in a number of other ways and the particular method shown should not limit the scope of the present invention.

According to an embodiment of the invention, the resilient member 207 comprises an at least partially deformable plate. However, the resilient member 207 may take a variety of different shapes and the present invention should not be limited to a plate shaped resilient member 207. By deformable it is meant that the shape of at least a portion of the resilient member 207 can be distorted by the application of a force and then returned to its original shape when the force is removed. The resilient member 207 may comprise a variety of materials, such as stainless steel, plastic, etc. Although the resilient member 207 may comprise a SMA material, in many embodiments, the resilient member 207 does not comprise a SMA material. This may be especially useful in situations where it is undesirable to have an SMA material in contact with the fluid.

The resilient member 207 can be used to transfer the force created by the SMA wire 206 to lift the valve seal 209 from the valve seat 216 to unseal the valve 100. It should be appreciated that although the valve seat 216 is shown proximate the valve outlet 103, in other embodiments, the valve seat 216 is located proximate the valve inlet 102. Therefore, the present invention should not be limited to embodiments that seal the valve outlet 103. Although the resilient member 207 may comprise a unitary piece, the resilient member 207 shown in the figures includes a deformable portion 212 and a substantially stationary portion 213. According to an embodiment of the invention, when the resilient member 207 is under pressure created by the SMA component 206, at least the deformable portion 212 reacts by deforming from a first position to at least a second position. In the embodiment shown, this deformation is away from the valve seat 216 while the stationary portion 213 remains substantially stationary or at least does not deform as much as the deformable portion 212.

According to an embodiment of the invention, the resilient member 207 is coupled to the one or more biasing members 208A, 208B. Although two biasing members 208A, 208B are shown in the figures, it should be appreciated that in some embodiments only one biasing member is provided. Alternatively, more than two biasing members can be provided (See FIG. 5). Therefore, the particular number of biasing members 208 should not limit the scope of the present invention. The biasing members 208 may be provided to transfer the force created by the SMA wire 206 to the resilient member 207. According to an embodiment of the invention, the biasing members 208 may be coupled to the ends 214 of the resilient member 207. According to the embodiment shown, the biasing member 208A is coupled to the resilient member 207 substantially opposite the biasing member 208B. In the embodiment shown, the biasing member 208A is coupled to a first end 214 of the resilient member 207 while the biasing member 208B is coupled to a second end 214 of the resilient member 207. However, it should be appreciated that other configurations are possible. For example, if only one biasing member 208 were implemented, the end 214 of the resilient member 207 not coupled to a biasing member 208 could be coupled to a stationary portion of the valve 100, such as the housing 101.

According to an embodiment of the invention, the SMA wire 206 can be coupled to the biasing members 208A, 208B. The SMA wire 206 can be stretched over the biasing members 208A, 208B while the SMA wire 206 is below the transformation temperature, for example to couple an outside portion of the biasing members 208A, 208B such that the biasing members 208A, 208B are positioned between the resilient member 207 and the SMA wire 206. In embodiments with two biasing members 208A, 208B, the force applied to the resilient member 207 can be enhanced because the tension created by the SMA wire 206 acts on both sides of the resilient member 207. Furthermore, it is generally understood that the amount of change a SMA component can be deformed and returned to its original memorized state is based on a percentage change of the total length of the component. Therefore, the longer the SMA component 206, the greater the change that can be realized upon transformation from the component's first state (martensitic) to its second state (austenitic). In embodiments where two biasing members 208A, 208B are utilized rather than a single biasing member, a longer SMA wire 206 is required. This longer SMA wire 206 results in a greater change in length upon heating and therefore, a greater force applied to the resilient member 207. It should be appreciated that although the biasing members 208A, 208B have been shown as comprising separate and distinct components, in some embodiments, the biasing members 208A, 208B can comprise an integral portion of the resilient member 207. The resilient member 207 may include a portion where the SMA component 206 can engage with and therefore, the SMA component 206 can act directly on the resilient member 207 and separate biasing members can be omitted.

According to an embodiment of the invention, the SMA wire 206 can be sealed off from the resilient member 207 and thus, the fluid flowing through the valve 100, using one or more sealing members 211A, 211B. The sealing members 211 can be coupled to the resilient member 207 and more particularly to the stationary portion 213 of the resilient member 207. In embodiments where the sealing members 211 are coupled to the stationary portion 213 rather than the deformable portion 212, the sealing members 211 are less likely to wear out from fatigue due to the repeatable deformation of the resilient member 207. This is because the sealing members 211 can be coupled to the portion of the resilient member 207 that experiences little or no movement as the SMA wire 206 contracts as its temperature increases above the transformation temperature. Advantageously, there is less chance of the sealing members 211 developing a leak and requiring maintenance or replacement of the valve 100.

Figure 3:
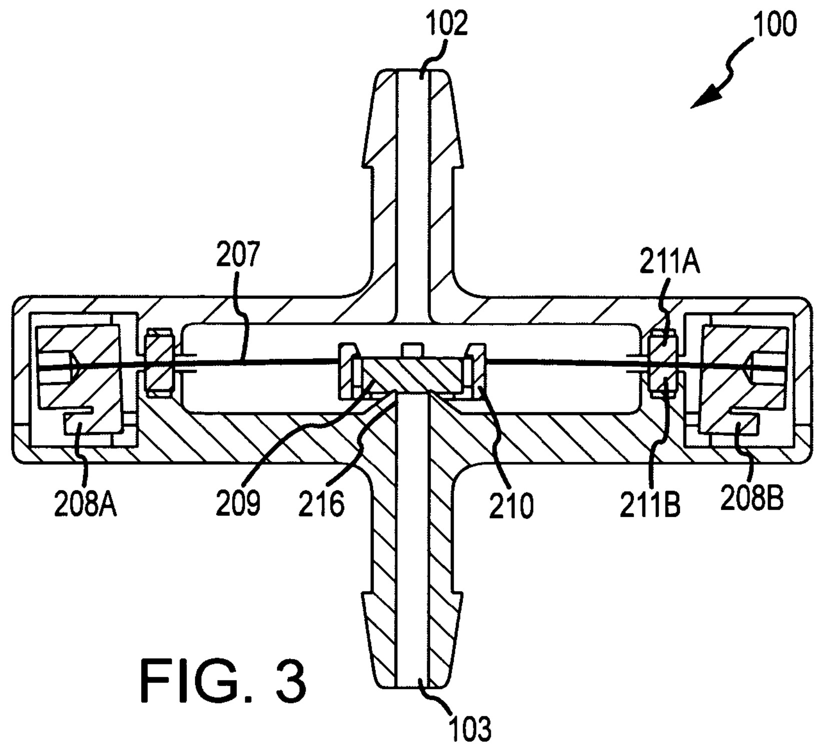
FIG. 3 shows a cross-sectional view of the valve according to an embodiment of the invention.

FIG. 3 shows a cross sectional view of the valve 100 according to an embodiment of the invention. The valve 100 is shown in a closed position with the valve seal 209 substantially sealing the fluid outlet 103. The valve 100 shown in FIG. 3 therefore, is shown with the SMA wire 206 stretched over the biasing members 208A, 208B and below the transformation temperature. Although the SMA wire 206 may be in tension, the tension in the SMA wire 206 below the transformation temperature is not great enough to overcome the resiliency of the resilient member 207 and the biasing members 208. Therefore, the valve seal 209 remains sealed to the valve seat 216 and the valve 100 remains closed.

Figure 4:
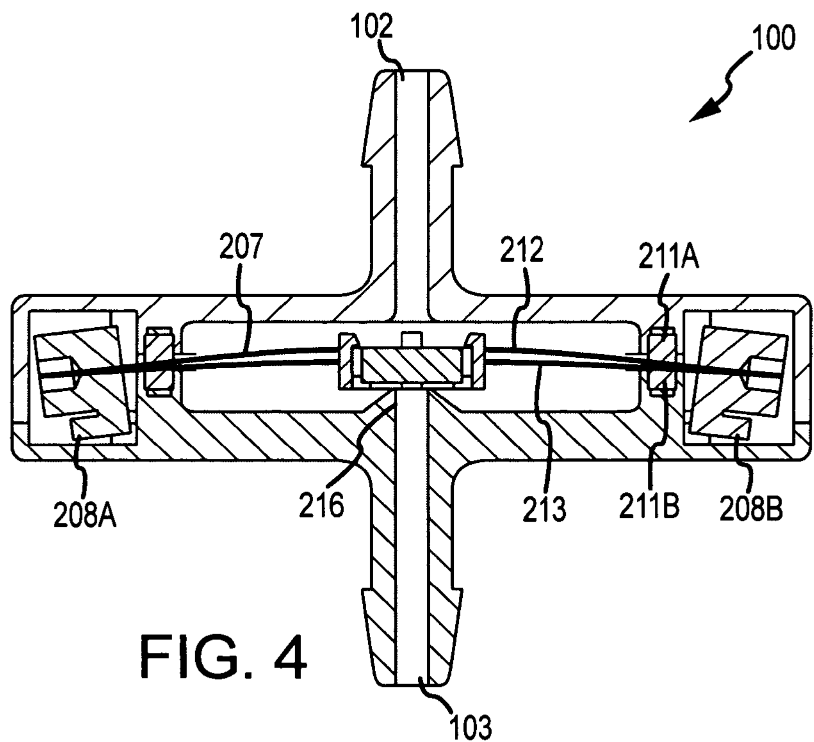
FIG. 4 shows a cross-sectional view of the valve according to another embodiment of the invention.

FIG. 4 shows a cross sectional view of the valve 100 according to another embodiment of the invention. In the embodiment shown in FIG. 4, the SMA wire 206 is above the transformation temperature and therefore the wire 206 transforms into its austenitic state thereby reducing in length back to its pre-stretched length. In this state, the SMA wire 206 pulls inward on the biasing members 208. In response, the biasing members 208 bias the resilient member 207 such that the deformable portion 212 of the resilient member 207 deforms upward in response to the force created by the SMA wire 206. Once the deformable portion 212 deforms, the valve seal 209 is lifted away from the valve seat 216 because the valve seal 209 is coupled to the deformable portion 212. This deformation opens the fluid flow path between the inlet 102 and the outlet 103. Fluid is therefore free to flow through the valve 100. As shown, the stationary portion 213 remains substantially straight as the deformable portion 212 is deformed away from the outlet 103. It should be appreciated that in embodiments where the sealing members 211A, 211B are coupled to the stationary portion 213, the sealing members 211A, 211B are not subject to the repeatable deformation of the deformable portion 212.

In operation, the SMA wire 206 is positioned around the resilient member 207, or in embodiments including the biasing members 208A, 208B, the SMA wire 206 is positioned around the biasing members 208A, 208B. According to an embodiment of the invention, the SMA wire 206 is positioned around the biasing members 208A, 208B while the SMA wire 206 is below the transformation temperature and therefore in its martensitic state. According to an embodiment of the invention, the SMA wire 206 can be stretched around the biasing members 208A, 208B to a first length that is greater than the SMA wire's memorized second length. Therefore, the SMA wire 206 will be in tension. With the SMA wire 206 below the transformation temperature, the tension in the wire 206 that is exerted on the biasing members 208A, 208B is not sufficient to deform the resilient member 207. Therefore, the resilient member 207 can retain the valve seal 209 in a first valve seal position, which is sealed against the valve seat 216. In this position, the fluid flow communication path between the inlet 102 and the outlet 103 is substantially closed thereby preventing fluid flow through the valve 100. According to an embodiment of the invention, the sealing members 211A, 211B can be coupled to the resilient member 207 such that the SMA wire 206 is substantially sealed off from the fluid flowing through the valve 100. In this manner, any electrical energy or temperature change experienced by the SMA wire 206 is substantially isolated from the fluid.

Upon energizing the electrical contacts 104, the resistance in the SMA wire 206 causes the wire 206 to heat via thermoelectric heating to a temperature above the transformation temperature. Although the electrical contacts 104 are described, it should be appreciated that in other embodiments, a separate heating element may be used to energize the SMA wire 206. Therefore, the present invention should not be limited to the electrical contacts 104. It should be appreciated that energizing the SMA wire 206 may comprise thermoelectrically energizing or some other form of thermal energy, such as provided by a separate heating element, for example. Furthermore, in embodiments where the SMA wire 206 is replaced with another electrically actuated component, the energy supplied to the component may actuate without a substantial increase in temperature.

Upon heating to above the transformation temperature, the SMA wire 206 transforms from a first state (its martensitic) state to a second state (its austenitic state). In its austenitic state, the SMA wire 206 returns to its original memorized second length. As the SMA wire 206 returns to its second length, the biasing members 208A, 208B can move from a first position to a second position. In the embodiment shown, this movement is inwards, towards the center of the valve 100. Alternatively, if the biasing members 208A, 208B are rotatably coupled to the housing 101, the portion of the biasing member 208 that is coupled to the SMA wire 206 can rotate from the first position to the second position. As a result of the movement of the biasing members 208A, 208B, the resilient member 207 is compressed inward.

In response to the compressive force of the biasing members 208A, 208B, the deformable portion 212 of the resilient member 207 is deformed from a first position to a second position. Because the valve seal 209 is coupled to the resilient member 207 via the valve seal coupling member 210, this upward deformation raises the valve seal 209 from the first valve seal position. In the embodiment shown, the movement of the valve seal 209 away from the first valve seal position opens a fluid flow path between the inlet 102 and the outlet 103. According to an embodiment of the invention, the valve seal 209 may remain lifted away from the valve seat 216 until energy is removed from the electrical contacts 105 and the temperature of the SMA wire 206 returns to below the transformation temperature. In the embodiment shown, the deformation of the resilient member 207 is away from the valve seat 216. However, it should be appreciated that in other embodiments, the deformation may be towards the valve seat. In other words, the valve may comprise a normally open valve wherein energizing the valve closes the valve rather than opening it. According to a normally open valve embodiment, actuating the valve seal 209 away from the first valve seal position would bring the valve seal 209 to the valve seat 216 thereby sealing the valve 100 rather than unsealing the valve 100.

In order to close the valve 100 once again, the energy supplied to the electrical contacts 104 can be removed. Upon removal of the energy, the temperature of the SMA wire 206 rapidly decreases to at least below the transformation temperature. Once the temperature of the SMA wire 206 falls to below the transformation temperature, the SMA wire 206 can transform back to its martensitic state. Therefore, the SMA wire 206 again stretches to the first size due to the force of the resilient member 207 along with the biasing members 208A, 208B that are providing an outward force. As the SMA wire 206 is allowed to stretch, the deformable portion 212 of the resilient member 207 can return to its original position, thereby bringing the valve seal 209 back to the first valve seal position. Although the description above has discussed the valve seal 209 as engaging the valve seat 216 that is proximate the valve outlet 103, it should be appreciated that in other embodiments, the valve seal 216 may seal the valve inlet 102 rather than the valve outlet 103.

Figure 5:
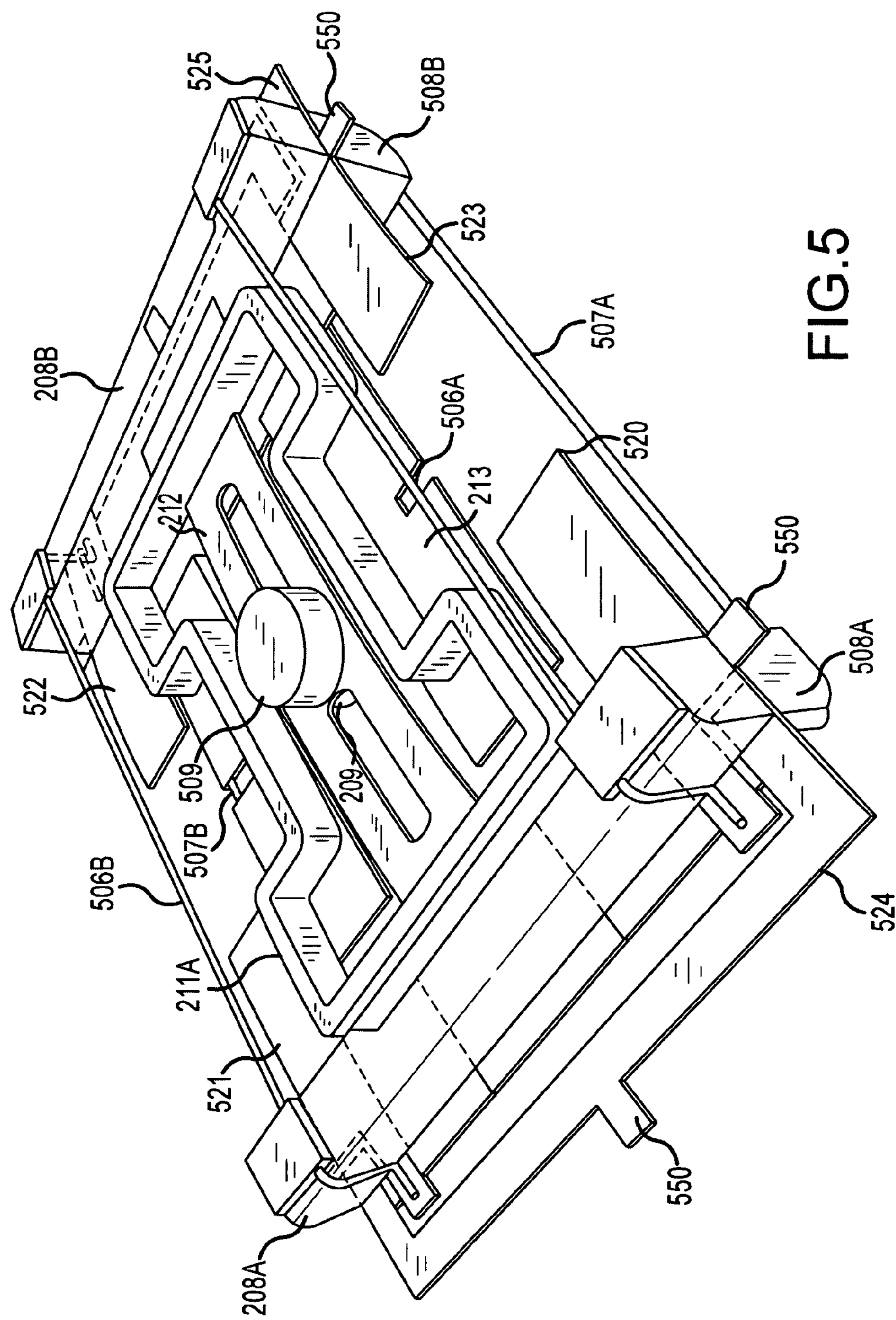
FIG. 5 shows the internal components of the valve according to another embodiment of the invention.

FIG. 5 shows the internal components of the valve 100 according to another embodiment of the invention. In some embodiments, it may be desirable to retain the valve 100 in a specific actuated position without requiring a continuous supply of power to the SMA wire 206. The valve 100 shown in FIG. 5 includes a plurality of latching arms 520-523 that are configured to retain the resilient member 207 in a specific position. It should be appreciated that while four latching arms are shown, the valve 100 may include any number of latching arms and the particular number implemented should not limit the scope of the present invention. The latching arms 520-523 can be coupled to the resilient member 207 using the first and second biasing members 208A, 208B as well as third and fourth biasing members 508A, 508B. It should be appreciated that although four biasing members are shown, in other embodiments, the biasing members 208A, 508A and the biasing members 208B, 508B may comprise a single biasing member. In alternative embodiments, a single biasing member 208 may be used as described above.

The latching arms 520, 521 may be coupled to one another using a first connecting arm 524 while the latching arms 522, 523 can be coupled to one another using a second connecting arm 525. Other additional components shown in FIG. 5 include additional SMA wires 506A, 506B, 507A, 507B, and a second valve seal 509.

The latching arms 520-523 can be provided to retain the resilient member 207 in a deformed (actuated) position. This may be particularly useful in embodiments where the valve 100 comprises a 3/2 valve, i.e., three ports, rather than a 2/2 valve (two ports). Although the latching arms 520-523 are shown as substantially straight in FIG. 5, the housing 101A, 101B can be provided with engaging portions (not shown) that pre-stress the latching arms 520-523 when the valve 100 is fully assembled with the latching arms 520-523 coupled to the housing 101. For example, the portion of the latching arms 520-523 inside of the biasing members may be forced towards the outside of the valve, i.e., towards the biasing members 208A, 208B, 508A, 508B. As a result, the latching arms 520-523 are compressed. As can be appreciated, to maintain their length, the latching arms 520-523 will deform or otherwise bend, either up or down. Therefore, the portion of the latching arms 520-523 coupled to the biasing members 208A, 208B, 508A, 508B can be movable between a first position (up) and a second position (down), while the inner portion of the latching arms 520-523 is retained in a substantially stationary position by the housing 101. Because the resilient member 207 pivots about the seals 211A, 211B as shown in the previous figures, the deformable portion 212 will deform in the opposite direction as the latching arms 520-523.

Once assembled within the valve housing 101, the latching arms 520-523 can maintain the valve 100 in at least two stable positions. The first position may be where the latching arms 520-523 are deformed upward, toward the top portion 101A of the housing and therefore are in a first position. In this first position the valve seals 209, 509 can be in the first valve seal position with the first valve seal 209 sealed against the valve seat 216. The second latching arm position may be where the latching arms 520-523 are deformed downward, toward the bottom portion 101B of the housing. In this second position, valve seals 209, 509 can be in a second valve seal position with the second valve seal 509 sealed against a second valve seat (not shown). The second valve seat could correspond to the fluid inlet 102, for example. Therefore, the valve 100 can include at least a third fluid port (not shown) to selectively communicate with the fluid inlet 102 and the fluid outlet 103 depending on the position of the latching arms 520-523 and thus, the deformable portion 212. It should be appreciated that the latching arms 520-523 can be maintained in either the first position or the second position absent the SMA wires being energized.

To actuate the valve 100 shown in FIG. 5, the valve 100 is provided with additional SMA wires. Although four SMA wires 506A, 506B, 507A, 507B are shown, it should be appreciated that the valve 100 shown in FIG. 5 may comprise only two SMA wires with a first SMA wire coupled to the first and second biasing members 208A, 208B and at least a second SMA wire coupled to the third and fourth biasing members 508A, 508B. The SMA wires 506A, 506B can act opposite the SMA wires 507A, 507B. In other words, if the SMA wires 506A, 506B coupled to the first and second biasing members 208A, 208B are energized, the SMA wires 506A, 506B will transform to their second state to pull the biasing members 208A, 208B towards the center of the valve 100. As a result, the deformable portion 212 of the resilient member 207 deforms downward and the valve seal 209 can seal against the valve seat 216, while the portion of the latching arms 520-523 coupled to the biasing members 208A, 208B will deform upward. If the SMA wires 506A, 506B are then de-energized, the latching arms 520-523 can retain the deformable portion 212 in this first actuated position. As mentioned above, this is because a threshold force is required for the latching arms 520-523 to switch positions.

In order to change the position of the resilient member 207 as well as the latching arms 520-523, the SMA wires 507A, 507B coupled to the third and fourth biasing members 508A, 508B can be energized. Once, the SMA wires 507A, 507B are energized, they transform from their first state into their second state in order to pull the biasing members 508A, 508B towards the center of the valve 100. At the same time, the biasing members 208A, 208B rotate slightly outward and stretch the SMA wires 506A, 506B. As a result of the biasing members 508A, 508B being pulled towards the center of the valve 100, the biasing members 508A, 508B exert a biasing force on the latching arms 520-523, which then flip the portion of the latching arms 520-523 coupled to the biasing members 508A, 508B down to the second position. As the latching arms 520-523 flip downward, the deformable portion 212 of the resilient member 207 moves upwards such that the valve seals 209, 509 move away from the first valve seal position to the second valve seal position where the valve seal 509 can seal against the second valve seat. The SMA wires 507A, 507B can be de-energized and the latching arms 520-523 can retain the deformable portion 212 in this second position.

As shown in FIG. 5, the SMA wires 506A, 506B, 507A, 507B do not include electrical contacts as in the embodiments described in the previous figures. According to an embodiment of the invention, the SMA wires 506A, 506B, 507A, 507B can be electrically coupled to the latching arms 520-523. Therefore, power can be supplied to the latching arms 520-523 in order to energize the SMA wires 506A, 506B, 507A, 507B.

In addition to the functional aspects of the resilient member 207 and latching arms 520-523, FIG. 5 also shows a plurality of tabs 550. In some embodiments, multiple latching arms 520-523 and the resilient members 207 may be formed from a single piece of material. The tabs 550 may be provided to separate each unit (a unit consisting of the resilient member 207 and the latching arms 520-523 required in a single valve 100). The tabs 550 may be formed thin enough that they can break apart with relative ease to separate the units. Therefore, the units can be mass produced rather than requiring individual manufacturing of each component.

The operation of the valve 100 can be performed quickly and quietly. Although the response time of the SMA wire requires heat transfer, the speed of actuation can be controlled based, in part, on the energy supplied to the electrical contacts 104, for example. The actuation speed can be increased by increasing the energy supplied to the electrical contacts 104. However, the de-energizing time depends mostly upon the cooling down process of the SMA wires as well as the deformation force provided by the resilient member 207. Furthermore, the energy supplied to the SMA wire 206 can be controlled to create a proportional valve. In one example, the energy supplied to the SMA wire 206 can be controlled by a pulse width modulation signal. Utilizing a pulse width modulation signal, the temperature of the SMA wire 206 can be controlled to oscillate between a first temperature when the SMA wire 206 begins to transform to the austenite state (austenite start temperature) and a second temperature when the SMA wire 206 has fully transformed into the austenite state (austenite finish temperature). As a result, the transformation of the martensite state into the austenite state can co-exist resulting in the resilient member 207 being held in a partially open position. However, other methods may be employed.

According to an embodiment of the invention, the position of the valve seal 209 can be determined by measuring the resistance of the SMA wire 206, for example. The resistance of the SMA wire 206 is generally proportional to the temperature and the strain. Therefore, by measuring the resistance through the wire 206, the position of the valve seal 209 and thus, the percentage that the valve 100 is opened can be determined to a reasonable degree of certainty. This calibration can be performed in the field or by the manufacturer, for example.

Although the description and figures have discussed a normally closed valve, i.e., energizing the valve opens the valve, it should be appreciated that the valve 100 may alternatively comprise a normally open valve whereby energizing the valve 100 closes the valve 100. Furthermore, it should be appreciated that the specific orientations discussed with respect to the inlet 102 and the outlet 103 can likewise be easily switched. Therefore, the particular configuration shown should not limit the scope of the present invention as other configurations are possible as those skilled in the art will readily recognize.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other valves, and not just to the embodiments described above and shown in the accompanying figures. Accordingly, the scope of the invention should be determined from the following claims.

We claim:

1. A valve (100), including a fluid inlet (102) and a fluid outlet (103) formed in a housing (101), the valve (100) comprising:

a valve seal (209);

a resilient member (207) directly coupled to the valve seal (209), the resilient member including a deformable portion (212) and a stationary portion (213); and one or more shape memory alloy components (206) directly coupled to at least a first end (214) of the resilient member (207), the resilient member configured such that when the one or more shape memory alloy components (206) pull inward on at least the first end (214) of the resilient member (207), the deformable portion of the resilient member (207) is deformed in response.

2. The valve (100) of claim 1, further comprising one or more biasing members (208A, 208B, 508A, 508B) coupled to the resilient member (207) and positioned between the resilient member (207) and the one or more shape memory alloy components (206).

3. The valve (100) of claim 1, further comprising one or more sealing members (211A, 211B) coupled to the resilient member (207) and located such that the one or more shape memory alloy components (206) is sealed off from a fluid flowing through the valve (100).

4. The valve (100) of claim 1, further comprising one or more electrical contacts (104) coupled to the one or more shape memory alloy components (206).

5. The valve (100) of claim 1, further comprising a valve seal coupling member (210) coupled to the valve seal (209) and the resilient member (207).

6. The valve (100) of claim 1, further comprising one or more latching arms (520-523) coupled to the resilient member (207) and the housing (101) and movable between a first position and at least a second position.

7. The valve (100) of claim 6, further comprising one or more biasing members (208A, 208B) coupled to the resilient member (207) on a first side of the one or more latching arms (520-523) and one or more additional biasing members (508A, 508B) coupled to the resilient member (207) on a second side of the one or more latching arms (520-523).

8. A valve (100), including a fluid inlet (102) and a fluid outlet (103) formed in a housing (101), the valve (100) comprising:

a valve seal (209);

a resilient member (207) directly coupled to the valve seal (209), the resilient member including a deformable portion (212) and a stationary portion (213); and an electrically actuated component (206) directly coupled to the resilient member (207), the electrically actuated component (206) configured such that when the electrically actuated component (206) pulls inward on the resilient member (207), the deformable portion of the resilient member (207) is deformed in response.

9. The valve (100) of claim 8, further comprising one or more biasing members (208A, 208B) coupled to the resilient member (207) and positioned between the resilient member (207) and the electrically actuated component (206).

10. The valve (100) of claim 8, further comprising one or more sealing members (211A, 211B) coupled to the resilient member (207) and located such that the electrically actuated component (206) is sealed off from a fluid flowing through the valve (100).

11. The valve (100) of claim 8, further comprising one or more electrical contacts (104) coupled to the electrically actuated component (206).

12. The valve (100) of claim 8, further comprising a valve seal coupling member (210) coupled to the valve seal (209) and the resilient member (207).

13. A method for controlling a flow of a fluid through a valve, comprising steps of:

energizing at least a first shape memory alloy component above a transformation temperature, wherein the shape memory alloy component transforms from a first state to a second state at the transformation temperature, the one or more shape memory alloy components is directly coupled to at least a first end of a resilient member, and the resilient member includes a deformable portion and a stationary portion;

deforming at least the deformable portion of the resilient member from a first position to at least a second position using the first shape memory alloy component as the shape memory alloy transforms from the first state to the second state by pulling inward on at least the first end of the resilient member; and actuating a valve seal away from a first valve seal position using the resilient member.

14. The method of claim 13, wherein the step of energizing the shape memory alloy component comprises energizing one or more electrical contacts coupled to the shape memory alloy component.

15. The method of claim 13, wherein the step of energizing the shape memory alloy component comprises energizing one or more electrical contacts coupled to the shape memory alloy component with a pulse width modulation signal.

16. The method of claim 13, further comprising deforming the resilient member with one or more biasing members coupled to at least the first end of the resilient member.

17. The method of claim 13, further comprising steps of:

de-energizing the first shape memory alloy component, wherein the first shape memory alloy component transforms from the second state to the first state;

returning the resilient member to the first position as the first shape memory alloy component transforms from the second state to the first state; and repositioning the valve seal to the first valve seal position as the resilient member returns to its first position.

18. The method of claim 13, further comprising steps of:

de-energizing the first shape memory alloy component; and retaining the resilient member in the second position using one or more latching arms.

19. The method of claim 18, further comprising steps of:

energizing at least a second shape memory alloy component above a transformation temperature of the at least second shape memory alloy, wherein the second shape memory alloy component transforms from a first state to a second state of the at least second shape memory alloy at the transformation temperature of the at least second shape memory alloy;

deforming at least a portion of the resilient member from the second position to the first position as the second shape memory alloy component transforms from the first state to the second state; and actuating the valve seal from a second valve seal position back to the first valve seal position with the resilient member.

20. The method of claim 19, further comprising steps of:

de-energizing the at least second shape memory alloy component; and retaining the resilient member in the first position using one or more latching arms.

* * * * *